(12) United States Patent
Koci et al.

(10) Patent No.: US 9,062,577 B2
(45) Date of Patent: Jun. 23, 2015

(54) DIESEL ENGINE OPERATION FOR FAST TRANSIENT RESPONSE AND LOW EMISSIONS

(75) Inventors: Chad P. Koci, Chillicothe, IL (US); Vlad L. C. Ulmet, San Antonio, TX (US); Stefan Simescu, Boerne, TX (US); Magdi K. Khair, San Antonio, TX (US); Gary D. Neely, Boerne, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 491 days.

(21) Appl. No.: 13/471,086

(22) Filed: May 14, 2012

(65) Prior Publication Data

US 2013/0304357 A1    Nov. 14, 2013

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *F01N 3/035* | (2006.01) |
| *F02D 41/10* | (2006.01) |
| *F02D 41/00* | (2006.01) |
| *F01N 3/10* | (2006.01) |
| *F02D 21/08* | (2006.01) |
| *F02D 41/02* | (2006.01) |
| *F02B 37/00* | (2006.01) |
| *F02M 25/07* | (2006.01) |
| *F01N 13/00* | (2010.01) |

(52) U.S. Cl.
CPC ............. *F01N 3/035* (2013.01); *F02D 41/029* (2013.01); *F02D 41/10* (2013.01); *F02D 41/0055* (2013.01); *F02D 2250/32* (2013.01); *Y02T 10/47* (2013.01); *F01N 3/103* (2013.01); *F02B 37/00* (2013.01); *F02M 25/0707* (2013.01); *F02M 25/0718* (2013.01); *F02D 21/08* (2013.01); *F01N 13/009* (2014.06); *Y02T 10/24* (2013.01)

(58) Field of Classification Search
CPC ... Y02T 10/47; F02D 41/0072; F02D 41/005; F02D 41/0062; F02M 25/0707; F02M 25/0713; F02M 25/0718; F02M 25/07
USPC .............. 123/568.12–568.32, 559.1; 701/108
See application file for complete search history.

(56) References Cited

U.S. PATENT DOCUMENTS

| | | | | |
|---|---|---|---|---|
| 4,938,198 | A  * | 7/1990 | Suzuki | 123/676 |
| 6,178,749 | B1 * | 1/2001 | Kolmanovsky et al. | 60/605.2 |
| 6,502,397 | B1 * | 1/2003 | Lundqvist | 60/605.2 |
| 2003/0084876 | A1 * | 5/2003 | Stanglmaier | 123/431 |
| 2003/0101724 | A1 * | 6/2003 | Zurawski et al. | 60/605.2 |
| 2009/0090329 | A1 * | 4/2009 | Wang et al. | 123/305 |
| 2010/0300073 | A1 * | 12/2010 | Khair et al. | 60/285 |
| 2011/0180038 | A1 * | 7/2011 | Yamakawa et al. | 123/435 |

(Continued)

*Primary Examiner* — Mahmoud Gimie
*Assistant Examiner* — Sizo Vilakazi
(74) *Attorney, Agent, or Firm* — Chowdhury & Georgakis PC; Ann C. Livingston

(57) ABSTRACT

A method for controlling emissions in the exhaust gas of a diesel engine, the engine having an exhaust gas recirculation (EGR) system. The engine's exhaust aftertreatment system need have only an oxidation catalyst and a particulate filter (with no NOx reduction or adsorption device). In "normal" engine conditions, the engine is operated with a lean air-fuel ratio, with "normal" engine conditions being engine conditions other than transient load increase engine conditions. Also, during normal engine conditions, the EGR system is used to reduce engine-out NOx. During transient load increase engine conditions, the engine is operated stoichiometrically or near stoichiometrically and the use of EGR is interrupted.

7 Claims, 1 Drawing Sheet

(56) References Cited

U.S. PATENT DOCUMENTS

| | | | |
|---|---|---|---|
| 2011/0214650 A1* | 9/2011 | Wang et al. | 123/703 |
| 2012/0118275 A1* | 5/2012 | Kang et al. | 123/568.11 |
| 2012/0125301 A1* | 5/2012 | Ide et al. | 123/568.21 |
| 2013/0304357 A1* | 11/2013 | Koci et al. | 701/108 |

* cited by examiner

DIESEL ENGINE OPERATION FOR FAST TRANSIENT RESPONSE AND LOW EMISSIONS

TECHNICAL FIELD OF THE INVENTION

This invention relates to diesel-fueled internal combustion engines, and more particularly to a method of operating a diesel engine in a manner that achieves fast transient load response and low emissions.

BACKGROUND OF THE INVENTION

Internal combustion engines are subject to strict emission limits. Approaches to reducing emissions include improved combustion designs and fuel modifications, but these improvements have fallen short of meeting emissions limits. Other approaches involve the use of exhaust aftertreatment devices, which have achieved significant emissions reductions.

For diesel engines, which are conventionally run at a lean air-fuel ratio, the main pollutants of concern are oxides of nitrogen (NOx) and particulate matter (PM). The latter is composed of black smoke (soot), sulfates generated by sulfur in fuel, and components of unburned fuel and oil.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to operating a diesel engine stoichiometrically during transient load increase engine operation. "Transient" engine operation as opposed to steady state operation, refers to the complex thermodynamic and dynamic phenomena that are experienced by a diesel engine during a change from steady state (equilibrium) operation. For a vehicle, examples of conditions that give rise to a transient load response of its engine are external load changes (i.e., driving up a hill), acceleration, and cold or hot starting. The transient load response may last only a second or two or may last up to several minutes.

The following description is further directed to diesel engines that use exhaust gas recirculation (EGR) or some other engine-out emissions control strategy. During transient load increases, the engine is operated at a stoichiometric or near-stoichiometric air-fuel ratio and the use of EGR is interrupted. By "transient load increase" as used herein is meant a positive increase in the engine load. An example of this is an increased demand in engine load (torque) due to an external load, such as driving up a hill. A pure engine speed transient, such as a change in rpm for the same engine load, is not included, nor is a deceleration from a higher engine load to a lower load. At other times (when the engine is not experiencing a transient load increase), the engine is operated at a lean air-fuel ratio, and EGR is used to reduce NOx.

A feature of the invention is that the engine's exhaust aftertreatment system need not include a special NOx adsorption or NOx reduction device. In other words, there need be no such separate device, and there need be no NOx adsorption or NOx reduction catalyzation of other aftertreatment devices.

The exhaust aftertreatment system may comprise simply an oxidation catalyst and a catalyzed particulate filter. During "normal" (lean) engine operation, the use of one or more engine-out emissions control strategy, such as EGR, in combination with this aftertreatment system, is sufficient to reduce tailpipe-out NOx to acceptable levels. During transient load increases (stoichiometric and no EGR) engine operation, emissions are adequately treated with the aftertreatment system.

Figure 1:
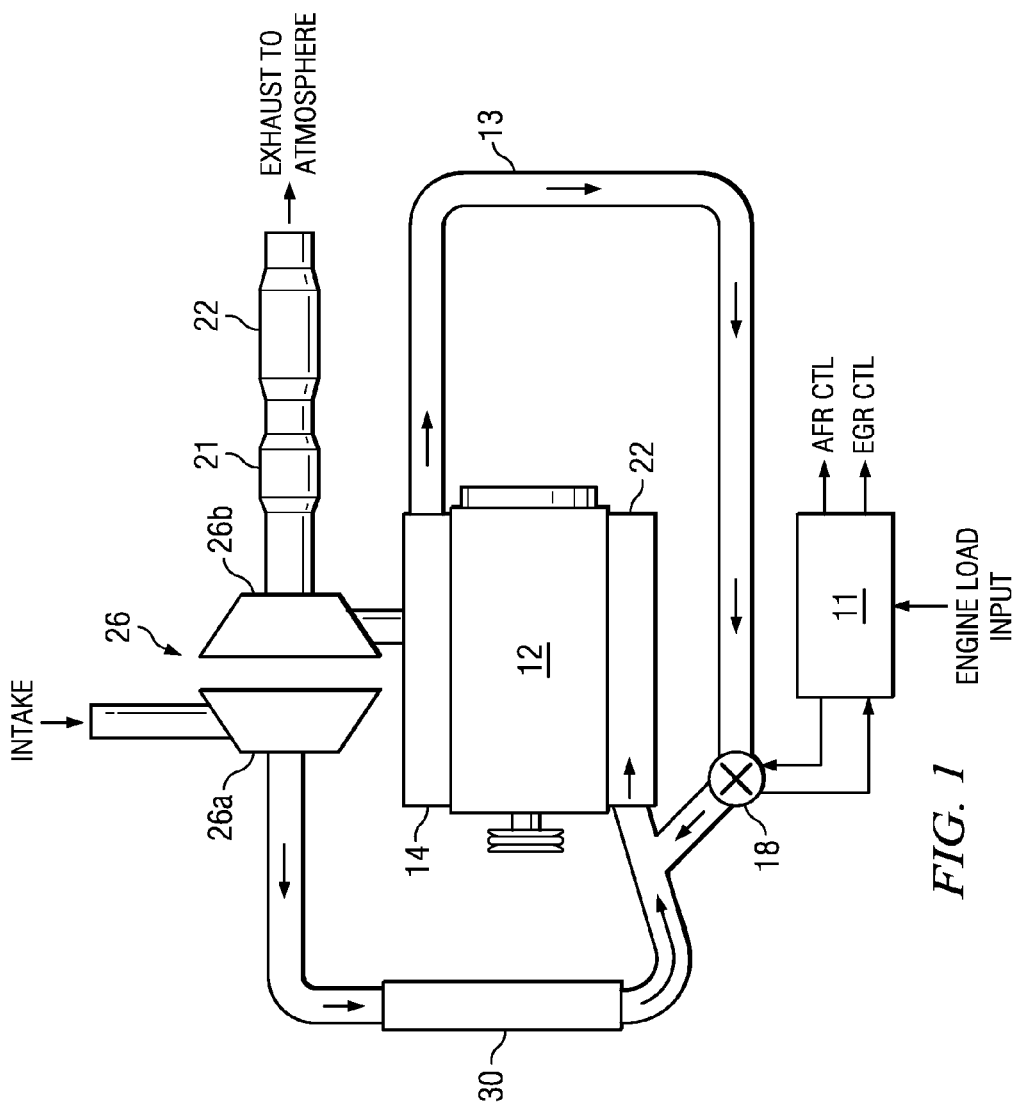
FIG. 1 illustrates a diesel-fueled engine system suitable for operation in accordance with the invention.

FIG. 1 illustrates a diesel engine system suitable for operation in accordance with the invention. In the illustrative embodiment, the system has a diesel engine 12, an exhaust gas recirculation (EGR) loop 13, and is an air-boosted system having a turbocharger 26.

The direction of flow of exhaust gas through the EGR loop 13 is indicated by directional arrows. Exhaust gas discharged from the engine's exhaust manifold 14 is directed through the EGR loop 13, which may include a filter and/or heat exchanger (not shown). The recirculated exhaust gas flows to an EGR valve 18, and then to the engine's intake manifold 22 where it is mixed with fresh intake air.

The engine's intake air is compressed by the turbocharger's compressor 26a, which is mechanically driven by its turbine 26b. Desirably, the compressed air discharged from the compressor 26a is cooled through an intercooler 30 positioned between the compressor 26a and the intake manifold 22.

The exhaust aftertreatment system comprises a diesel oxidation catalyst (DOC) 21 and a catalyzed diesel particulate filter (DPF) 22. Oxidation catalyst 21 and DPF 22 are typically installed in-line on an under-floor exhaust line. The treated exhaust exits the DPF 22 into the atmosphere via the tailpipe.

Oxidation catalyst 21 may be a flow-through device with a platinum or other precious metal formulation, designed to either reduce the concentration of or to oxidize hydrocarbon and CO, and for conversion of NO to NO2. Alternatively, oxidation catalyst 21 may be a flow-through device with O2 storage capability as well as a precious metal formulation.

DPF 22 reduces PM emissions in the exhaust by trapping soot particles. The catalyzation of DPF 22 improves its ability to passively regenerate by additional NO to NO2 conversion. Soot oxidation by NO2 occurs at lower temperatures than soot oxidation by O2. Forced or active regeneration may still be required periodically, during which fueling actions (and/or other events) are performed to raise the temperature within the DPF 22 high enough to oxidize the collected PM.

An example of a suitable DPF 22 is a ceramic wall flow filter with a platinum catalyst coating on the walls of the DPF 22. Additional catalyst formulations may be used, such as rhodium, for NO and NO2 conversion.

Control unit 11 may be processor-based, programmed to control various aspects of engine operation as described herein. In general, control unit 11 may be implemented with various controller devices known or to be developed. Further, control unit 11 may be part of a more comprehensive engine control unit that controls various other engine and/or emissions devices.

Control unit 11 is programmed to receive input signals and provide control output signals, in the manner described below. The input signals include at least a signal representing engine load conditions. The output signals include at least a signal to control the engine's air-fuel ratio (AFR) and a signal to allow/disallow the flow of EGR to the engine intake.

In operation, engine 12 is operated during "normal" load conditions in a conventional lean burn mode. As indicated above, "normal" load conditions are load conditions other than transient load increase conditions above a certain predetermined threshold. EGR is provided to the engine in conventional manner so as to reduce NOx emissions by lowering combustion temperature and reducing oxygen.

Although EGR results in lower NOx, its use is accompanied by lowered engine efficiency. Although EGR lowers combustion temperature, its presence in the intake displaces fresh air inducted into the engine and requires the air boosting system to move more air mass for a given fresh air flow. To achieve a desired engine load response, the engine must induct more air to burn more fuel.

As further explained below, control unit 11 is programmed to control the system so that during transient load increase conditions, EGR is removed from the engine intake. Removing EGR increases the amount of fresh air because the EGR is no longer displacing fresh air. When EGR is removed, for a given boosting device and its associated efficiencies, the same amount of boosting energy provides more fresh air. In turn, as more fresh air is inducted into the engine, more fuel may be added and more energy is produced by the engine. This engine energy and engine power is then used to power the boosting device, which drives more airflow and fuel flow. The result is that small changes in airflow and fuel flow during an increasing engine load transient event result in a feedback loop that brings engine load response to higher levels.

Control unit 11 is further programmed so that also during transient load increase conditions, while EGR is removed, the engine is operated with a stoichiometric air-fuel ratio. A three-way catalyst will remove NOx, CO and hydrocarbon emissions simultaneously when the air-fuel ratio is stoichiometric. Alternatively, an aftertreatment system having a DOC 21 and DPF 22 will reduce NOx concentration during stoichiometric as well as rich operating conditions. Thus, if the air-fuel ratio is lowered to stoichiometric or slightly rich levels, a TWC or DOC/DPF aftertreatment system will reduce NOx during this period of non-lean operation.

Thus, during fast transient load increase condition, an engine-out NOx reduction scheme (such as EGR) may be temporarily ceased, if the engine is run stoichiometric or rich. The stoichiometric operation permits certain aftertreatment devices to effectively reduce tailpipe NOx emissions. This method for fast transient response addresses the problem of increased transient NOx emissions, thereby decoupling the emissions-performance tradeoff during transient events.

Figure 2:
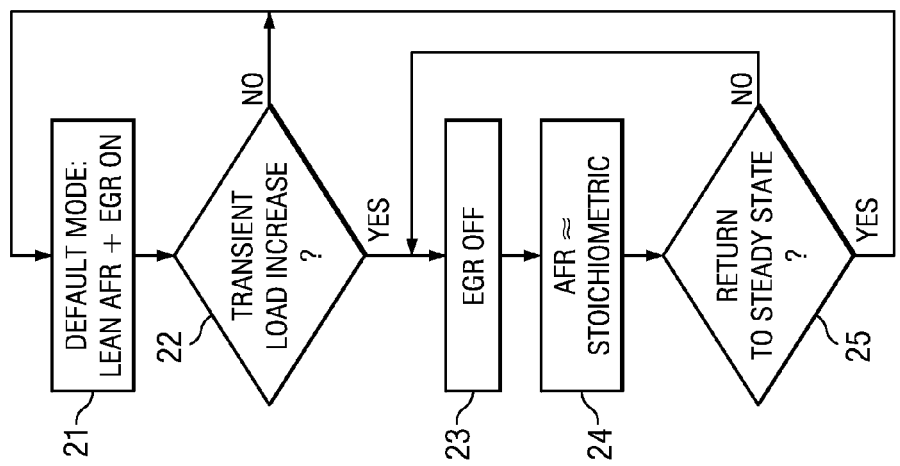
FIG. 2 illustrates a method of operating a diesel engine in accordance with the invention.

FIG. 2 illustrates a method of operating a diesel engine in accordance with the invention. As shown in Step 21, the "normal" (default) operating mode of the engine is in conditions in which there is no fast transient load increase. The engine is operated with a lean air-fuel ratio, and EGR is mixed with fresh air in the engine intake. The EGR rate and concentration may vary according to the engine's particular EGR control strategy, but in general, it is this EGR control strategy that dictates the EGR amount without being overridden by the transient load increase control strategy that is the subject of this method. In other words, in the default state, the engine's EGR control strategy determines how much EGR is provided rather than the engine's transient or non transient state.

Step 22 is determining whether the engine is experiencing a transient load increase. In general, this condition will be accompanied by an input signal or mechanism to increase engine torque. For example, a driver might apply pressure to the accelerator pedal. Or as another example, an engine governor might request increase engine load to meet an external driving condition. These events can be easily used to trigger a "torque requested" signal, to be used by control unit 11 to identify a transient load increase.

Control unit 11 may store or otherwise access a predetermined set-point, above which the engine is deemed to be operated in its transient load increase mode. The set point may represent a load amount or a rate of load increase or some combination of both.

If it is determined that the engine is undergoing a transient load increase, it is placed in transient load increase mode, which means that EGR into the engine's intake manifold is discontinued and the air-fuel ratio is switched to stoichiometric or near stoichiometric (Steps 23 and 24). In other words, fueling controls are activated to increase fuel to achieve a stoichiometric or near stoichiometric air-fuel ratio. In the example EGR system of FIG. 1, the interruption of EGR may be achieved by using valve 18.

As indicated in Step 25, engine load increase is monitored until the engine reaches steady state or near steady state. This may be determined by a predetermined set point as described above. When this occurs, the engine is returned to its default mode (EGR strategy normal and air-fuel ratio lean).

What is claimed is:

1. A method for operating a diesel engine in different modes to control emissions in the exhaust gas, the engine having an exhaust gas recirculation (EGR) system, the method comprising:
   installing an exhaust aftertreatment system having only an oxidation catalyst and a particulate filter and having no NOx reduction or adsorption device;
   operating the diesel engine with a lean air-fuel ratio in normal engine conditions, wherein normal engine conditions are engine conditions other than transient load increase engine conditions;
   during normal engine conditions using the EGR system to reduce engine-out NOx;
   monitoring the engine load to determine if the engine is in a transient load increase mode; and
   during the transient load increase mode, operating the diesel engine stoichiometrically or near stoichiometrically and discontinuing use of EGR into the engine's intake;
   wherein the transient load increase mode is not limited to high load conditions;
   during all modes of engine operation, treating the exhaust gas with only the exhaust aftertreatment system.

2. The method of claim 1, wherein the monitoring step is performed by monitoring engine torque demand.

3. The method of claim 2, wherein engine torque demand is in response to acceleration pedal action.

4. The method of claim 2, wherein engine torque demand is in response to an engine governor event.

5. The method of claim 1, wherein the monitoring step is performed by comparing the current engine load rate of increase to a predetermined set point.

6. The method of claim 1, wherein the step of interrupting the use of EGR is performed by actuating an EGR valve.

7. An exhaust aftertreatment system for controlling undesired emissions in the exhaust gas of a diesel engine, the engine having an exhaust gas recirculation (EGR) system and an exhaust line for carrying exhaust from the engine, comprising:
   an oxidation catalyst and a particulate filter installed on the exhaust line;
   memory for storing a transient load increase set point, the set point representing a transient load increase not limited to high load conditions;
   a processing unit for receiving a least one engine load input signal representing engine load increase conditions and for delivering an air-fuel ratio control signal to the engine and an EGR control signal to the EGR system;

wherein the processing unit is programmed to operate the diesel engine with a lean air-fuel ratio in normal engine conditions, wherein normal engine conditions are engine conditions other than transient load increase engine conditions; to monitor the engine load to determine if the engine is in a transient load increase condition; and during transient load increase conditions, to operate the diesel engine stoichiometrically or near stoichiometrically and to discontinue the use of EGR;

wherein the monitoring step is performed by comparing the engine load input signal to the set point.

* * * * *